(12) United States Patent
Terada et al.

(10) Patent No.: US 9,744,610 B2
(45) Date of Patent: Aug. 29, 2017

(54) CLAD MATERIAL, METHOD OF MANUFACTURING BRAZED PIPE, AND BRAZED PIPE

(71) Applicant: KEIHIN THERMAL TECHNOLOGY CORPORATION, Oyama-shi (JP)

(72) Inventors: Takashi Terada, Oyama (JP); Kazuyuki Takahashi, Oyama (JP); Youhei Ikawa, Oyama (JP)

(73) Assignee: KEIHIN THERMAL TECHNOLOGY CORPORATION, Oyama-Shi (JP)

( * ) Notice: Subject to any disclaimer, the term of this patent is extended or adjusted under 35 U.S.C. 154(b) by 349 days.

(21) Appl. No.: 14/311,352

(22) Filed: Jun. 23, 2014

(65) Prior Publication Data
US 2015/0000783 A1    Jan. 1, 2015

(30) Foreign Application Priority Data

Jun. 27, 2013  (JP) .................. 2013-134855

(51) Int. Cl.
*B32B 15/01* (2006.01)
*B23K 1/00* (2006.01)
(Continued)

(52) U.S. Cl.
CPC .............. *B23K 1/0012* (2013.01); *B23K 1/20* (2013.01); *B23K 35/0222* (2013.01); *B23K 35/0227* (2013.01); *B23K 35/0238* (2013.01); *B23K 35/286* (2013.01); *B32B 1/08* (2013.01); *B32B 15/016* (2013.01); *C22C 21/00* (2013.01); *C22C 21/02* (2013.01); *F16L 9/02* (2013.01); *F16L 9/17* (2013.01); *F28D 1/05366* (2013.01); *F28F 9/02* (2013.01); *F28F 21/084* (2013.01); *F28F 21/089* (2013.01); *Y10T 428/12486* (2015.01)

(58) Field of Classification Search
None
See application file for complete search history.

(56) References Cited

U.S. PATENT DOCUMENTS 6,638,376 B2 * 10/2003 Hasegawa ................ C22F 1/04
                                                                148/437
8,158,273 B2 *  4/2012 Wittebrood .......... B23K 35/002
                                                                165/905
2009/0255656 A1 * 10/2009 Numasawa .......... B23K 1/0012
                                                                165/173

FOREIGN PATENT DOCUMENTS

JP     2008-240084   10/2008
WO   WO 2007/114366  10/2007

* cited by examiner

*Primary Examiner* — Daniel J Schleis
(74) *Attorney, Agent, or Firm* — Mori & Ward, LLP

(57) ABSTRACT

A clad material includes a core material, a first skin material covering one side of the core material, and a second skin material covering the other side of the core material. The clad material is brazed in a state in which the first and second skin materials overlap each other. The core material is made of an Al alloy containing Mn (0.6 to 1.5 mass %), Ti (0.05 to 0.25 mass %), Cu (less than 0.05 mass %), Zn (less than 0.05 mass %), Fe (0.2 mass % or less), and Si (0.45 mass % or less) (balance: Al and unavoidable impurities). The first skin material is made of an Al alloy containing Si (6.8 to 11.0 mass %) and Zn (0.05 mass % or less) (balance: Al and unavoidable impurities). The second skin material is made of an Al alloy containing Si (4.0 to 6.0 mass %) and Cu (0.5 to 1.0 mass %) (balance: Al and unavoidable impurities).

3 Claims, 3 Drawing Sheets

(51) Int. Cl.
  *B23K 1/20*    (2006.01)
  *B32B 1/08*    (2006.01)
  *F16L 9/02*    (2006.01)
  *C22C 21/00*   (2006.01)
  *C22C 21/02*   (2006.01)
  *F28F 9/02*    (2006.01)
  *F28F 21/08*   (2006.01)
  *F28D 1/053*   (2006.01)
  *F16L 9/17*    (2006.01)
  *B23K 35/28*   (2006.01)
  *B23K 35/02*   (2006.01)

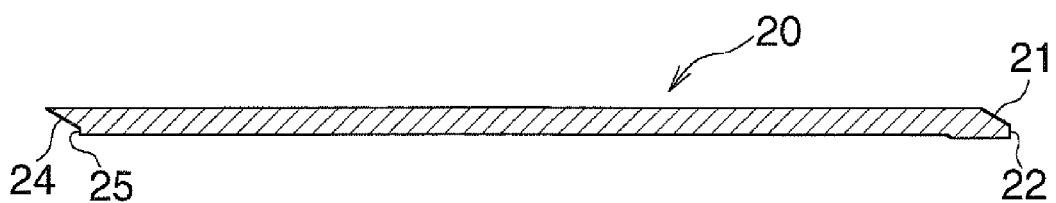
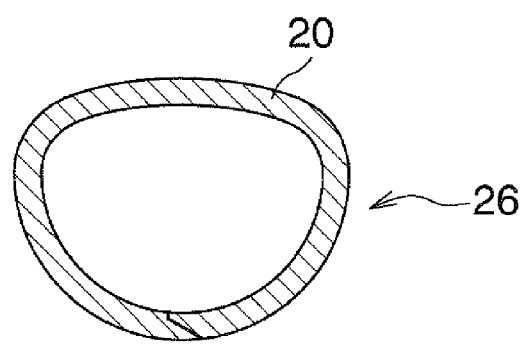

CLAD MATERIAL, METHOD OF MANUFACTURING BRAZED PIPE, AND BRAZED PIPE

CROSS-REFERENCE TO RELATED APPLICATIONS

The present application claims priority under 35 U.S.C. §119 to Japanese Patent Application No. 2013-134855, filed Jun. 27, 2013. The contents of this application are incorporated herein by reference in their entirety.

BACKGROUND OF THE INVENTION

The present invention relates to a clad material which is composed of a core material, a first skin material covering one side of the core material, and a second skin material covering the other side of the core material and which is used for manufacturing, for example, components for a heat exchanger. The present invention also relates to a method of manufacturing a brazed pipe using the clad material, and to a brazed pipe.

In this specification, the term "spontaneous potential" of a material refers to the electrode potential of the material within an acidic (pH: 3) aqueous solution of 5% NaCl with respect to a saturated calomel electrode (S.C.E.), which serves as a reference electrode.

BACKGROUND ART

There has been known a clad material for heat exchangers which is composed of a core material, a first skin material covering one side of the core material and forming the wall surface of a refrigerant passage, and a second skin material covering the other side of the core material and forming an outer surface which comes into contact with the atmosphere (see Japanese Patent Application Laid-Open (kokai) No. 2008-240084). Such a clad material is used for manufacturing components for heat exchangers. In the known clad material, the core material is made of an Al alloy which contains Si in an amount of 0.3 to 1.5 mass %, Mn in an amount of 0.5 to 1.8 mass %, Mg in an amount of 1.5 mass % or less, Cu in an amount of 1.0 mass % or less, and Ti in an amount of 0.1 to 0.35 mass %, the balance being Al and unavoidable impurities. The first skin material is made of an Al alloy which contains Si in an amount of 1.5 mass % or less, Mn in an amount of 1.8 mass % or less, and Cu in an amount of 1.0 mass % or less, the balance being Al and unavoidable impurities. The second skin material is made of an Al alloy which contains Si in an amount of 1.5 mass % or less, Mn in an amount of 1.8 mass % or less, and Zn in an amount of 2.5 to 7.0 mass %, the balance being Al and unavoidable impurities. The Cu content of the first skin material is equal to or higher than the Cu content of the core material.

In the clad material disclosed in the above-mentioned publication, the spontaneous potential of a layer (the second skin material) which forms an outer surface of an heat exchanger exposed to an corrosive environment is rendered less noble than the core material so that the layer serves as a sacrificial anode layer for the core material; and the spontaneous potential of a layer (the first skin material) which forms an inner surface of the heat exchanger which comes into contact with refrigerant is rendered noble with respect to the core material, whereby a sacrificial protection effect is attained at positions deeper than the center of the core material in the thickness direction thereof.

Incidentally, a widely known heat exchanger applied to a condenser of an air conditioning apparatus for a vehicle has a structure shown in FIG. 1. As shown in FIG. 1, the heat exchanger denoted by reference numeral 1 includes a pair of headers 2 and 3 made of aluminum (encompassing the case where an aluminum alloy is used; the same also applies to the following description). The headers 2 and 3 extend in the vertical direction and are disposed such that they are spaced from each other in the left-right direction. A plurality of heat exchange tubes 4 made of aluminum are disposed between the headers 2 and 3 at predetermined intervals in the vertical direction, and opposite ends of the heat exchange tubes 4 are connected to the headers 2 and 3. Corrugate fins 5 made of aluminum are disposed between adjacent heat exchange tubes 4 and on the outer sides of the uppermost and lowermost heat exchange tubes 4, and are brazed to the corresponding heat exchange tubes 4. Side plates 6 made of aluminum are disposed on the outer sides of the uppermost and lowermost corrugate fins 5, and are brazed to the corresponding corrugate fins 5. The left header 2 is divided by a partition member 7 into upper and lower header sections 2a and 2b, at a position higher than the center of the left header 2 in the height direction. The right header 3 is divided by another partition member 7 into upper and lower header sections 3a and 3b, at a position lower than the center of the right header 3 in the height direction. A fluid inlet (not shown) is formed at the upper header section 2a of the left header 2, and an inlet member 8 having a fluid inflow passage 8a communicating with the fluid inlet is brazed to the upper header section 2a. A fluid outlet (not shown) is formed at the lower header section 3b of the right header 3, and an outlet member 9 having a fluid outflow passage 9a communicating with the fluid outlet is brazed to the lower header section 3b. Each of the left and right headers 2 and 3 is composed of a brazed pipe 10 and closing members 11, which are made of aluminum and which are brazed to opposite ends of the pipe 10 so as to close the openings at the opposite ends. The pipe 10 is manufactured as follows. A blank plate formed of an aluminum brazing sheet having a brazing material layer on each of opposite sides thereof is formed into a tubular shape, and opposite side edge portions of the blank plate are caused to overlap partially, and are brazed to each other.

The brazed pipe 10 is manufactured by, for example, a method as shown in FIGS. 2 and 3 (see the pamphlet of WO2007/114366).

The method described in the pamphlet of the international publication is as follows. First, there is prepared a blank plate 20 formed of a clad material composed of a core material 20a, a first skin material 20b made of an aluminum alloy brazing material and covering one side of the core material 20a, and a second skin material 20c made of an aluminum alloy brazing material and covering the other side of the core material 20a (see FIG. 3(a)). A first slant surface 21 is formed on the upper surface of the right side edge portion of the blank plate 20 such that the first slant surface 21 inclines downward toward the end (right end), and a first flat surface 22 is formed between the lower end of the first slant surface 21 and the lower surface such that the first flat surface 22 forms an obtuse angle in relation to the first slant surface 21, and a right angle in relation to the lower surface. Although the first slant surface 21 is covered with the first skin material 20b, the first flat surface 22 is not covered with the first skin material 20b (see FIGS. 2(a) and 3(b)). Also, a second slant surface 24 is formed on the lower surface of the left side edge portion of the blank plate 20 such that the second slant surface 24 inclines upward toward the end (left end), and a second flat surface 25 is formed between the lower end of the second slant surface 24 and the lower surface such that the second flat surface 25 forms an obtuse angle in relation to the second slant surface 24, and a right angle in relation to the lower surface. A portion of the second slant surface 24 on the side toward the second flat surface 25 and the second flat surface 25 are covered with the second skin material 20c. Also, a left side edge portion of the upper surface of the blank plate 20 is not covered with the first skin material 20b, and a left-side portion of the second slant surface 24 is not covered with the second skin material 20c (see FIGS. 2(a) and 3(c)). The angle formed between the upper surface of the blank plate 20 and the second slant surface 24 is supplementary to the angle formed between the upper surface of the blank plate 20 and the first slant surface 21.

Subsequently, the blank plate 20 is formed into a tubular shape such that the first surface covered with the first skin material 20b is located on the outer side and the second surface covered with the second skin material 20c is located on the inner side. The slant surfaces 21 and 24 at the opposite side edge portions are then brought into surface contact with each other, and the flat surfaces 22 and 25 are butted against each other for surface contact therebetween, whereby a tubular body 26 for brazed pipe is obtained (see FIGS. 2(b) and 3(d)). In the tubular body 26 for brazed pipe, since the slant surfaces 21 and 24 are in surface contact with each other, the first skin material 20b and the second skin material 20c overlap each other. Then, the tubular body 26 for brazed pipe is heated to a predetermined temperature. As a result, the slant surfaces 21 and 24 of the tubular body 26 are brazed together, and the flat surfaces 22 and 25 of the tubular body 26 are brazed together, whereby the brazed pipe 10 is completed. Although not illustrated, heat exchange tube insertion holes are formed in a center portion of the blank plate 20 with respect to the width direction thereof, and cutouts for forming the fluid inlet or the fluid outlet and notches for forming a partition member insertion slit are formed in left and right side edge portions of the blank plate 20. Notably, manufacture of the brazed pipe 10 is performed simultaneously with manufacture of the heat exchanger.

However, when the brazed pipe 10 for the headers 2 and 3 of the condenser 1 shown in FIG. 1 is manufactured from the clad material disclosed in the above-mentioned Japanese publication by the method disclosed in the pamphlet of the above-mentioned international publication, the surface of the first skin material 20b or the second skin material 20c of the clad material disclosed in the Japanese publication must be covered with a brazing material layer. Also, the spontaneous potential of a eutectic brazing material formed between the first slant surface 21 and the second slant surface 24 after the brazing becomes lower than the spontaneous potential of the core material. Therefore, the eutectic brazing material is preferentially corroded, which raises a problem in that the corrosion resistance of the brazed portion is low. In particular, in an acidic environment, since the dissolving speed of the eutectic brazing material becomes high, the preferential corrosion of the brazed portion of the brazed pipe 10 becomes remarkable. In order to prevent the preferential corrosion of the brazed portion of the brazed pipe 10, painting or chemical conversion treatment such as chromate treatment must be performed. Work for performing painting or chemical conversion treatment is troublesome and increases cost.

SUMMARY OF THE INVENTION

An object of the present invention is to solve the above-described problem and to provide a clad material which can improve the corrosion resistance of a brazed portion formed as a result of brazing performed in a state in which a first skin material covering one side of a core material and a second skin material covering the other side of the core material overlap each other. Another object of the present invention is to provide a brazed pipe and a method of manufacturing a brazed pipe.

To achieve the above object, the present invention comprises the following mode.

1) A clad material which is composed of a core material, a first skin material covering a first surface of the core material, and a second skin material covering a second surface of the core material, the clad material being brazed in a state in which the first skin material and the second skin material overlap each other, wherein the core material is made of an Al alloy containing Mn in an amount of 0.6 to 1.5 mass %, Ti in an amount of 0.05 to 0.25 mass %, Cu in an amount less than 0.05 mass %, Zn in an amount less than 0.05 mass %, Fe in an amount of 0.2 mass % or less, and Si in an amount of 0.45 mass % or less, the balance being Al and unavoidable impurities;

the first skin material is made of an Al alloy containing Si in an amount of 6.8 to 11.0 mass % and Zn in an amount of 0.05 mass % or less, the balance being Al and unavoidable impurities, and serves a brazing material; and the second skin material is made of an Al alloy containing Si in an amount of 4.0 to 6.0 mass % and Cu in an amount of 0.5 to 1.0 mass %, the balance being Al and unavoidable impurities.

2) A method of manufacturing a brazed pipe, comprising forming a blank plate formed of the clad material according to par. 1) into a tubular shape such that the first surface covered with the first skin material is located on the outer side and the second surface covered with the second skin material is located on the inner side; mating opposite side edge portions of the blank plate with each other such that the first skin material and the second skin material overlap each other; and brazing together the opposite side edge portions of the blank plate by making use of the first skin material of the blank plate.

3) A method of manufacturing a brazed pipe according to par. 2), comprising a step A of forming a first slant surface on the first surface of the blank plate covered with the first skin material such that the first slant surface extends along one side edge portion of the blank plate and inclines such that its position changes from the first surface side toward the second surface side of the blank plate as approaching the end, and forming a first flat surface between the first slant surface and the second surface such that the first flat surface forms an obtuse angle in relation to the first slant surface; a step B of forming a second slant surface on the second surface of the blank plate covered with the second skin material such that the second slant surface extends along the other side edge portion of the blank plate and inclines such that its position changes from the second surface side toward the first surface side of the blank plate as approaching the end, and forming a second flat surface between the second slant surface and the second surface such that the second flat surface forms an obtuse angle in relation to the second slant surface; a step C of forming the blank plate into a tubular shape such that the first surface covered with the first skin material is located on the outer side, bringing the two slant surfaces at the opposite side edge portions into surface contact with each other such that the first skin material and the second skin material overlap each other, and bringing the two flat surfaces into contact with each other, to thereby obtain a tubular member for brazed pipe; and a step D of brazing together the two slant surfaces at the opposite side edge portions of the blank plate forming the tubular member for brazed pipe and brazing together the two flat surfaces at the opposite side edge portions by making use of the first skin material of the blank plate, wherein one of the steps A and B is first performed, the other of the steps A and B is then performed, and the steps C and D are then performed in this sequence.

4) A brazed pipe manufactured by the method according to par. 2) or 3), wherein a eutectic brazing material present between the brazed opposite side edge portions of the blank plate is higher in spontaneous potential than the core material.

According to the clad material of par. 1), the following advantageous effect is attached. When brazed pipes for the header tanks of the condenser shown in FIG. 1 are manufactured by the method disclosed in the pamphlet of the above-mentioned international publication, the spontaneous potential of a eutectic brazing material formed between the first slant surface and the second slant surface after brazing becomes higher than and noble with respect to the spontaneous potential of the core material. Therefore, the eutectic brazing material is prevented from being corroded preferentially over the core material, whereby the corrosion resistance of the joined portion is improved. In addition, since the first skin material serves as a brazing material, no separate brazing material is required.

According to the method of manufacturing a brazed pipe of pars. 2) and 3), it is possible to manufacture a brazed pipe in which the spontaneous potential of the eutectic brazing material formed between the brazed opposite side edge portions of the blank plate is higher than the spontaneous potential of the core material.

According to the brazed pipe of par. 4), the spontaneous potential of the eutectic brazing material formed between the opposite side edge portions of the blank plate after brazing is higher than the spontaneous potential of the core material. Therefore, the eutectic brazing material is prevented from being corroded preferentially over the core material, whereby the corrosion resistance of the joined portion is improved.

BRIEF DESCRIPTION OF THE DRAWINGS

FIGS. 2A and 2B is a pair of vertical sectional views showing a method of manufacturing a tubular body for brazed pipe used for the headers of the heat exchanger of FIG. 1.

DESCRIPTION OF THE PREFERRED EMBODIMENT

An embodiment of the clad material according to the present invention will next be described.

Figure 1:
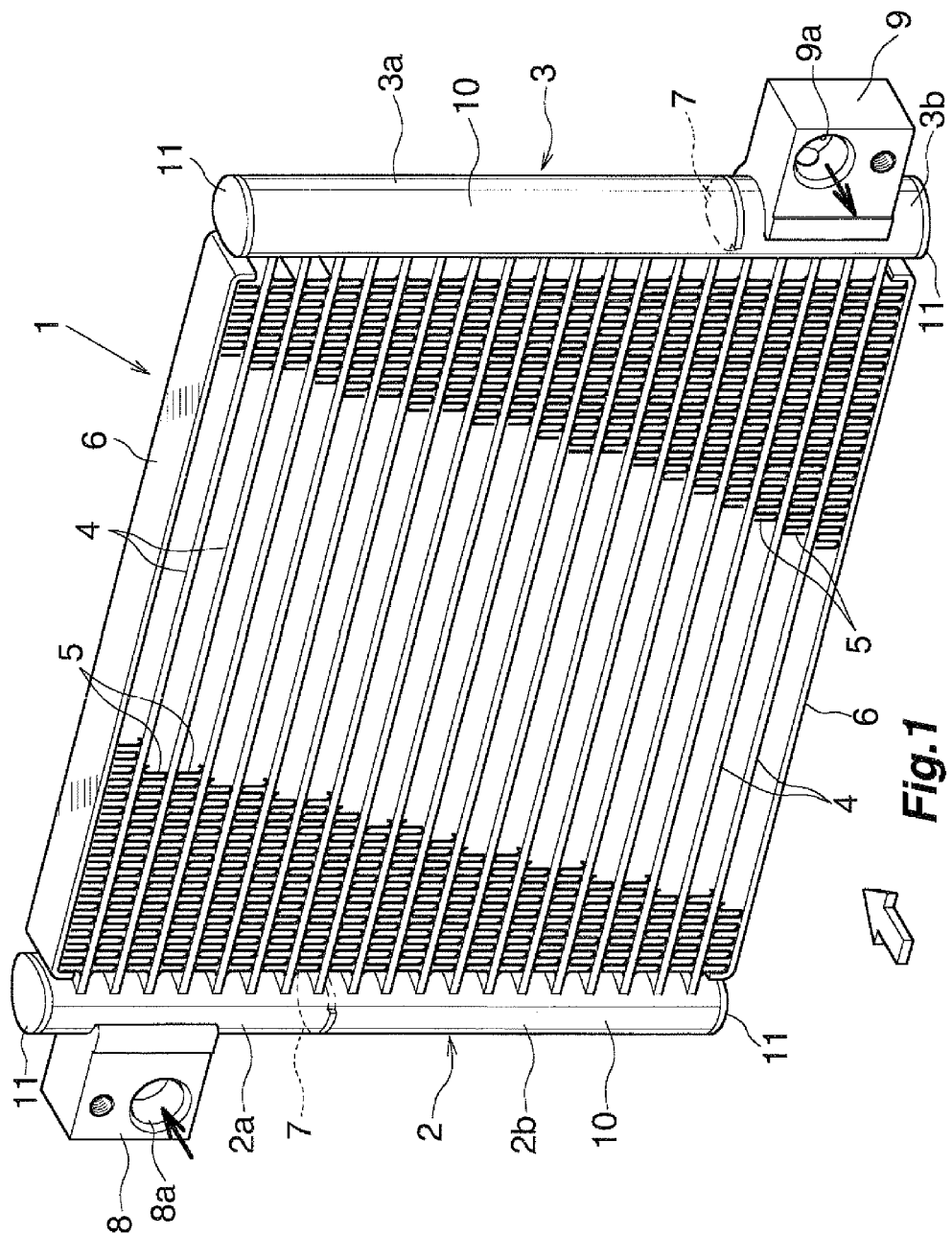
FIG. 1 is a perspective view showing the overall structure of a heat exchanger used as a condenser of an air conditioning apparatus for a vehicle.
Figure 3A:
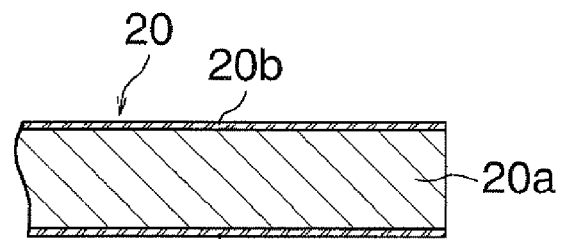
FIGS. 3A to 3D is a set of partial enlarged views of FIGS. 2A and 2B.
Figure 3B:
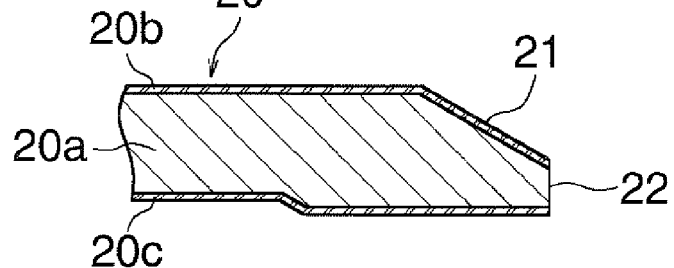
Figure 3C:
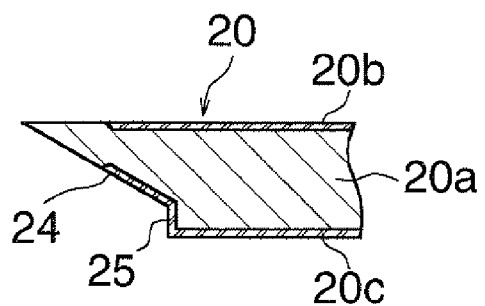
Figure 3D:
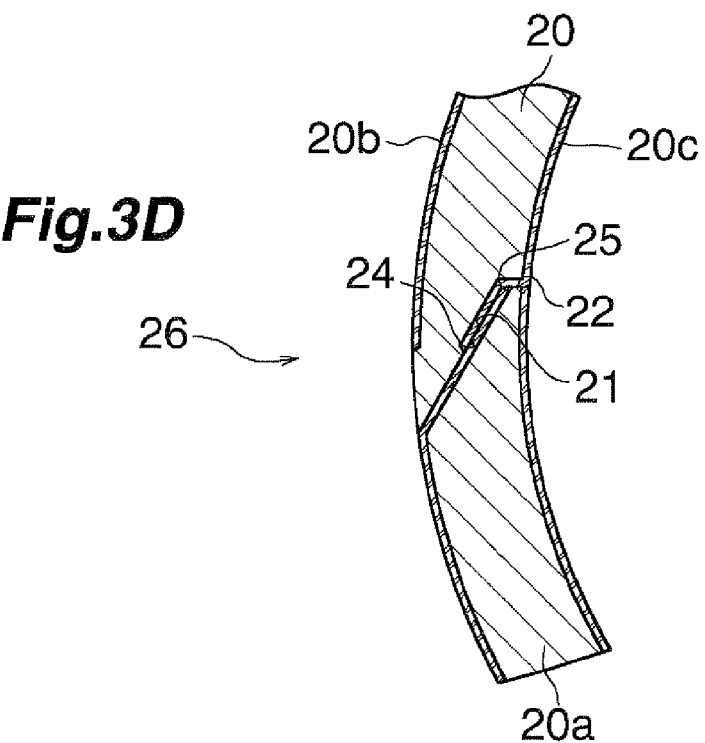

The clad material according to the present invention is composed of a core material, a first skin material covering one side of the core material, and a second skin material covering the other side of the core material. As shown in FIGS. 2 and 3, the clad material is formed into a tubular shape such that a first surface (one side) of the core material covered with the first skin material is located on the outer side, and a second surface (the other side) of the core material covered with the second skin material is located on the inner side. Thus, opposite side edges portions of the clad material are caused to mate with each other such that the first and second skin materials overlap each other. In this state, the opposite side edges portions are brazed together. Therefore, in the blank state (a state before the clad material is formed and brazed), the above-described first slant surface 21 is covered with the first skin material of the clad material, and the above-described second slant surface 24 and second flat surface 25 are covered with the second skin material.

The core material is made of an Al alloy containing Mn in an amount of 0.6 to 1.5 mass %, Ti in an amount of 0.05 to 0.25 mass %, Cu in an amount less than 0.05 mass %, Zn in an amount less than 0.05 mass %, Fe in an amount of 0.2 mass % or less, and Si in an amount of 0.45 mass % or less, the balance being Al and unavoidable impurities. The first skin material is made of an Al alloy containing Si in an amount of 6.8 to 11.0 mass % and Zn in an amount of 0.05 mass % or less, the balance being Al and unavoidable impurities. The first skin material serves as a brazing material. The second skin material is made of an Al alloy containing Si in an amount of 4.0 to 6.0 mass % and Cu in an amount of 0.5 to 1.0 mass %, the balance being Al and unavoidable impurities. Preferably, each of the first skin material and the second skin material has a clad ratio (the ratio of the thickness of the skin material to that of the core material) of 4 to 10%.

Next, there will be described the alloy compositions of the core material, the first skin material, and the second skin material of the clad material.

[Core Material]

Mn increases the strength of the core material. When the Mn content is excessively small, a sufficient degree of strength cannot be attained. When the Mn content is excessively large, the strength of the core material becomes excessively high, which makes it difficult to machine the opposite side edge portions of the clad material into the shapes shown in FIG. 3. Therefore, the Mn content must be 0.6 to 1.5 mass %.

Ti forms a Ti—Al compound in the Al alloy and disperses in layers. Since the spontaneous potential of the Ti—Al compound is noble, corrosion occurs in layers, and corrosion in the thickness direction (pitting corrosion) becomes unlikely to occur. Therefore, Ti improves the corrosion resistance. When the Ti content is excessively small, its effect of causing corrosion to occur in layers diminishes, and corrosion resistance decreases. When the Ti content is excessively large, its effect of improving the corrosion resistance saturates, and cost increases. Accordingly, the Ti content must be 0.05 to 0.25 mass %.

Cu is contained in the core material as an unavoidable impurity. When the Cu content is excessively high, the spontaneous potential of the core material becomes noble with respect to the spontaneous potential of the eutectic brazing material present between the brazed first and second slant surfaces, whereby the eutectic brazing material is corroded preferentially. Accordingly, the Cu content must be less than 0.05 mass %.

Zn is contained in the core material as an unavoidable impurity. When the Zn content is excessively high, the corrosion resistance of the core material itself decreases. Accordingly, the Zn content must be less than 0.05 mass %.

Fe is contained in the core material as an unavoidable impurity. When the Fe content is excessively high, the corrosion resistance of the core material itself decreases. Therefore, the Fe content must be 0.2 mass % or less.

Si is contained in the core material as an unavoidable impurity. When the Si content is excessively high, the resistance of the core material itself decreases. Therefore, the Si content must be 0.45 mass % or less.

Notably, the amounts of Cu, Zn, Fe, and Si contained as unavoidable impurities may be decreased to zero.

[First Skin Material]

The first skin material is a typical Al alloy brazing filler, and serves as a brazing material. The Si content of the first skin material is 6.8 to 11.0 mass %.

sively high, the second skin material cracks when it solidifies during casting. Accordingly, the Cu content must be 0.5 to 1.0 mass %.

Notably, the clad material is manufactured by press-bonding the core material, the first skin material, and the second skin material, which are cast separately.

Specific examples of the present invention will now be described along with comparative examples.

Five types of clad materials shown in Table 1 were prepared. In each clad material, the clad ratio of the first skin material and the second skin material is 8%.

TABLE 1

|  |  | Core material (mass %) | | | | | | | First skin material (mass %) | | | Second skin material (mass %) | | | Spontaneous potential (mV) | |
|---|---|---|---|---|---|---|---|---|---|---|---|---|---|---|---|---|
|  |  | Al | Mn | Ti | Cu | Zn | Fe | Si | Al | Si | Zn | Al | Si | Cu | Core material | Eutectic brazing material |
| Example | 1 | Bal | 0.6 | 0.1 | 0.01 | 0.01 | 0.10 | 0.45 | Bal | 8.7 | 0.01 | Bal | 5.0 | 0.7 | −730 | −710 |
|  | 2 | Bal | 0.6 | 0.1 | 0.01 | 0.01 | 0.10 | 0.45 | Bal | 8.7 | 0.01 | Bal | 5.0 | 0.9 | −710 | −690 |
|  | 3 | Bal | 1.1 | 0.1 | 0.01 | 0.01 | 0.10 | 0.25 | Bal | 8.7 | 0.01 | Bal | 5.0 | 0.7 | −730 | −705 |
|  | 4 | Bal | 1.1 | 0.1 | 0.01 | 0.01 | 0.10 | 0.25 | Bal | 8.7 | 0.01 | Bal | 5.0 | 0.9 | −730 | −705 |
| Comparative Example |  | Bal | 1.1 | 0.1 | 0.50 | — | 0.10 | 0.10 | Bal | 8.7 | 0.01 | Bal | 5.0 | 0.6 | −680 | −710 |

Zn is contained in the first skin material as an unavoidable impurity. When the Zn content is excessively high, the spontaneous potential of the eutectic brazing material present between the brazed first and second slant surfaces decreases and becomes less noble, whereby the eutectic brazing material is corroded preferentially. Accordingly, the Zn content must be 0.05 mass % or less. Notably, the amount of Zn contained as an unavoidable impurity may be decreased to zero.

[Second Skin Material]

Si brings the second skin material in a molten state when the opposite side edge portions of the clad material are brazed together in a state in which the first skin material and the second skin material overlap each other, to thereby facilitate dispersion of Cu from the first skin material to the molten material. When the Si content is excessively low, the melting of the second skin material becomes insufficient, and the dispersion of Cu from the first skin material to the molten material becomes insufficient. As a result, the spontaneous potential of the eutectic brazing material present between the brazed first and second slant surfaces fails to become higher than the spontaneous potential of the core material, whereby the eutectic brazing material is corroded preferentially. When the Si content is excessively high, the second skin material melts excessively. Therefore, when the clad material is used for manufacture of the brazed pipes 10 which constitute the two headers 2 and 3 of the above-described heat exchanger 1, the channels of the heat exchange tubes 4 may be clogged. Therefore, the Si content must be 4.0 to 6.0 mass %.

Cu disperses from the first skin material to the molten material, when the opposite side edge portions of the clad material are brazed together in a state in which the first skin material and the second skin material overlap each other, whereby the spontaneous potential of the eutectic brazing material present between the brazed first and second slant surfaces is rendered higher than the spontaneous potential of the core material. When the Cu content is excessively low, its effect cannot be attained. When the Cu content is exces- A blank plate 20 as shown in FIGS. 2 and 3 was prepared through use of each clad material. The blank plate 20 has a first slant surface 21, a first flat surface 22, a second slant surface 24, and a second flat surface 25. The first slant surface 21 is covered with the first skin material, and the second flat surface 25 and a portion of the second slant surface 24 on the side toward the second flat surface 25 are covered with the second skin material.

Subsequently, the blank plate 20 was formed into a tubular shape, the slant surfaces 21 and 24 at the opposite side edge portions were brought into surface contact with each other, and the flat surfaces 22 and 25 at the opposite side edge portions were caused to butt against each other, whereby a tubular body 34 was obtained. Then, the tubular body was heated to a predetermined temperature, whereby the slant surfaces 21 and 24 of the tubular body 34 were brazed together, and the flat surfaces 22 and 25 of the tubular body 34 were brazed together, whereby the brazed pipe 10 was manufactured.

The spontaneous potential of the core material of each of the manufactured pipes, and the spontaneous potential of the eutectic brazing material formed between the first and second slant surfaces were measured. The results of this measurement are also shown in Table 1.

As is apparent from the results shown in Table 1, when the alloy compositions of the core material and the two skin materials fall within the ranges of the present invention, the spontaneous potential of the eutectic brazing material formed between the first and second slant surfaces becomes higher than and noble with respect to the spontaneous potential of the core material. Therefore, the preferential corrosion of the eutectic brazing material can be prevented.

What is claimed is:
1. A clad material comprising:
a core material including a first surface and a second surface opposite to the first surface in a thickness direction of the core material, the core material being made of an Al alloy including Mn in an amount of 0.6 to 1.5 mass %, Ti in an amount of 0.05 to 0.25 mass %, Cu in an amount less than 0.05 mass %, Zn in an amount less than 0.05 mass %, Fe in an amount of 0.2 mass % or less, Si in an amount of 0.45 mass % or less, and Al;

a first skin material directly provided on the first surface of the core material and made of an Al alloy including Si in an amount of 6.8 to 11.0 mass %, Zn in an amount of 0.05 mass % or less, and Al, the first skin material serving as a brazing material; and a second skin material directly provided on the second surface of the core material and made of an Al alloy including Si in an amount of 4.0 to 6.0 mass %, Cu in an amount of 0.5 to 1.0 mass %, and Al.

2. The clad material according to claim 1, wherein the second skin material does not include Zn.

3. The clad material according to claim 1, wherein the core material includes a first end and a second end opposite to the first end in a direction along which the first surface and the second surface extend, the first end is brazed to the second end such that the first skin material contacts the second skin material.

* * * * *